(12) United States Patent
Park et al.

(10) Patent No.: US 8,509,197 B2
(45) Date of Patent: Aug. 13, 2013

(54) MEDIA ACCESS CONTROL METHOD OF DETERMINING DATA TRANSMISSION ORDER IN WIRELESS NETWORK

(75) Inventors: Chul Gyun Park, Gyunggi-do (KR); Chul Hee Kang, Seoul (KR); Sang Heon Pack, Seoul (KR); Hyun Hee Park, Seoul (KR); Joun Sup Park, Gyunggi-do (KR)

(73) Assignee: Samsung Electro-Mechanics Co., Ltd., Gyunggi-Do (KR)

(*) Notice: Subject to any disclaimer, the term of this patent is extended or adjusted under 35 U.S.C. 154(b) by 346 days.

(21) Appl. No.: 12/839,967

(22) Filed: Jul. 20, 2010

(65) Prior Publication Data

US 2011/0158220 A1 Jun. 30, 2011

(30) Foreign Application Priority Data

Dec. 30, 2009 (KR) .................. 10-2009-0134373

(51) Int. Cl.
*H04J 3/00* (2006.01)
*H04W 72/10* (2009.01)

(52) U.S. Cl.
CPC . *H04J 3/00* (2013.01); *H04W 72/10* (2013.01)
USPC ............ 370/336; 370/345; 370/444; 370/498

(58) Field of Classification Search
USPC .................. 370/328–338, 345, 442–444, 498
See application file for complete search history.

(56) References Cited

U.S. PATENT DOCUMENTS

| | | | |
|---|---|---|---|
| 2003/0003905 A1* | 1/2003 | Shvodian | 455/423 |
| 2005/0165950 A1* | 7/2005 | Takagi et al. | 709/236 |
| 2006/0242025 A1* | 10/2006 | Nishihara et al. | 705/15 |
| 2010/0271948 A1* | 10/2010 | Challapali et al. | 370/235 |
| 2010/0272076 A1* | 10/2010 | Cavalcanti | 370/336 |

FOREIGN PATENT DOCUMENTS

| | | | |
|---|---|---|---|
| JP | 2007104202 A | | 4/2007 |
| KR | 100769991 B1 | | 10/2007 |
| KR | 100783809 B1 | | 12/2007 |

OTHER PUBLICATIONS

Hyunhee Park et al., "A Deterministic Access Protocol in WiMedia Wireless Personal Area Networks," Journal of IKEEEE, vol. 13, No. 3, Sep. 9, 2009, pp. 267-277.
Korean Office Action for KR 10-2009-0134373 mailed May 27, 2011.

* cited by examiner

*Primary Examiner* — Pao Sinkantarakorn
(74) *Attorney, Agent, or Firm* — Lowe Hauptman Ham & Berner, LLP

(57) ABSTRACT

A media access control method in a wireless network is provided. Each of devices in the wireless network determines one of a plurality of beacon slots within a beacon period as a beacon slot of the device. The devices in the wireless network determine a data transmission order in accordance with the slot numbers of the beacon slots of the devices in a reserved period of a data transmission period. Data is transmitted in the unreserved period in accordance with the determined data transmission order.

7 Claims, 4 Drawing Sheets

| Octet: 1 | 1 | 1 | 2 | 1 | 1 | k |
|---|---|---|---|---|---|---|
| Element ID | Length | Reference Point (RP) | Target Dev. Addr. | Queue Existence (QE) | Access Category (AC) | Reserved |
| 21 | 22 | 23 | 24 | 25 | 26 | |

MEDIA ACCESS CONTROL METHOD OF DETERMINING DATA TRANSMISSION ORDER IN WIRELESS NETWORK

CROSS-REFERENCE TO RELATED APPLICATIONS

This application claims the priority of Korean Patent Application No. 10-2009-0134373 filed on Dec. 30, 2009, in the Korean Intellectual Property Office, the disclosure of which is incorporated herein by reference.

BACKGROUND OF THE INVENTION

1. Field of the Invention

The present invention relates to the fields of wireless communications, and more particularly, to a media access control method in a wireless network, which enables a plurality of devices to equally acquire a data transmission chance without competition in an unreserved transmission period.

2. Description of the Related Art

Recently, as applications such as wireless universal serial bus (USB), wireless display, and wireless video/HDTV streaming are integrated, high data transmission rates of several hundred Mbps are being required. In order to satisfy such a requirement, a variety of wireless communication standards capable of supporting high data transmission rates have been proposed. One of them is a WiMedia standard.

A channel access control method of the WiMedia standard is performed on the basis of competition such that a plurality of devices may use a slot period. In the channel access control method, different channel competition parameters are granted to application of four kinds of different access categories (ACs) including voice, video, best effort, and background, in order to perform differentiated transmission. That is, arbitrary inter-frame spaces (AIFS) may be granted differently, depending on the four categories to adjust a start time of backoff for carrier sense multiple access/collision avoidance (CSMA/CA). Furthermore, the ranges of the contention window (CW) determining the backoff time are granted differently in order to determine priorities in a channel occupation process of the CSMA/CA.

In particular, the conventional channel access control method of the WiMedia standard adopts a wireless channel access control scheme, in which a plurality of devices use an empty time slot on the basis of competition by using prioritized contention access (PCA) in an unreserved transmission period excluding a period reserved by a distributed reservation protocol (DRP), in a data transmission period of a super frame. This scheme is similar to an enhanced distributed coordination access (EDCA) scheme of existing IEEE 802.11e.

In general, when a time slot is reserved through a DRP period, a constant bit rate (CBR) type of traffic is transmitted. When this time slot is reserved, the time slot is not reserved in consideration of a maximum amount of data, but reserved in consideration of the average value for efficiency. At this time, when data is additionally generated, the reserved time slot period may become insufficient. In this case, traffic such as real-time traffic, which is sensitive of being transmitted after one super frame, needs to be transmitted by using the unreserved period (PCA period). Furthermore, video traffic having a variable bit rate (VBR) characteristic or file transfer protocol (FTP) traffic may use the PCA period, because it is not essential to transmit the traffic through a fixed time slot period. Furthermore, when VBR data is additionally generated or a command frame or control frame should immediately be sent to effectively change the communication, the PCA period is used. In the PCA period, however, the devices transmit data using the CSMA/CA. Therefore, periods in which a time slot is wasted by collision may increase, and the data transmission rate and the overall throughput may decrease.

SUMMARY OF THE INVENTION

An aspect of the present invention provides a media access control method in a wireless network, in which devices sequentially use channels using their slot numbers which can be known through a beacon period, without competition.

According to an aspect of the present invention, there is provided a media access control method in a wireless network, including: determining, by each of devices in the wireless network, one of a plurality of beacon slots within a beacon period as a beacon slot of the device; determining, by the devices in the wireless network, a data transmission order in accordance with the slot numbers of the beacon slots of the devices in an reserved period of a data transmission period; and transmitting data in the unreserved period in accordance with the determined data transmission order.

In the determining of the one of the plurality of beacon slots, each of the devices may scan beacon slots which are being used, and then determine one of the plurality of beacon slots after a beacon slot having the largest beacon slot number among the beacon slots which are being used within the beacon period, as a beacon slot of the device.

The determining of the data transmission order may include: broadcasting, by the devices, information elements containing a first field indicating whether data to be transmitted in the unreserved period exists or not; and receiving, in each of the devices, the information elements of the other devices in order to check whether or not the corresponding devices have data to transmit, and determining the data transmission order depending on the slot number of the beacon slot of the device, the slot numbers of the beacon slots of the other devices, and whether or not the devices have data to transmit.

The information elements may contain a second field indicating that a device transmits data first in the unreserved period. In the determining of the data transmission order, a device having a second field value indicating that the device is to transmit data first may be set to a device to transmit data first in the unreserved period, and the data transmission order may be determined depending on the slot numbers of the devices and whether or not the devices have data to transmit.

The device having a second field value indicating that the device is to transmit data first may be changed at every predetermined super frame.

The transmitting of the data may include transmitting the data at a permissible maximum transmission opportunity when the device to transmit the data in accordance with the determined data transmission order transmits the data.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
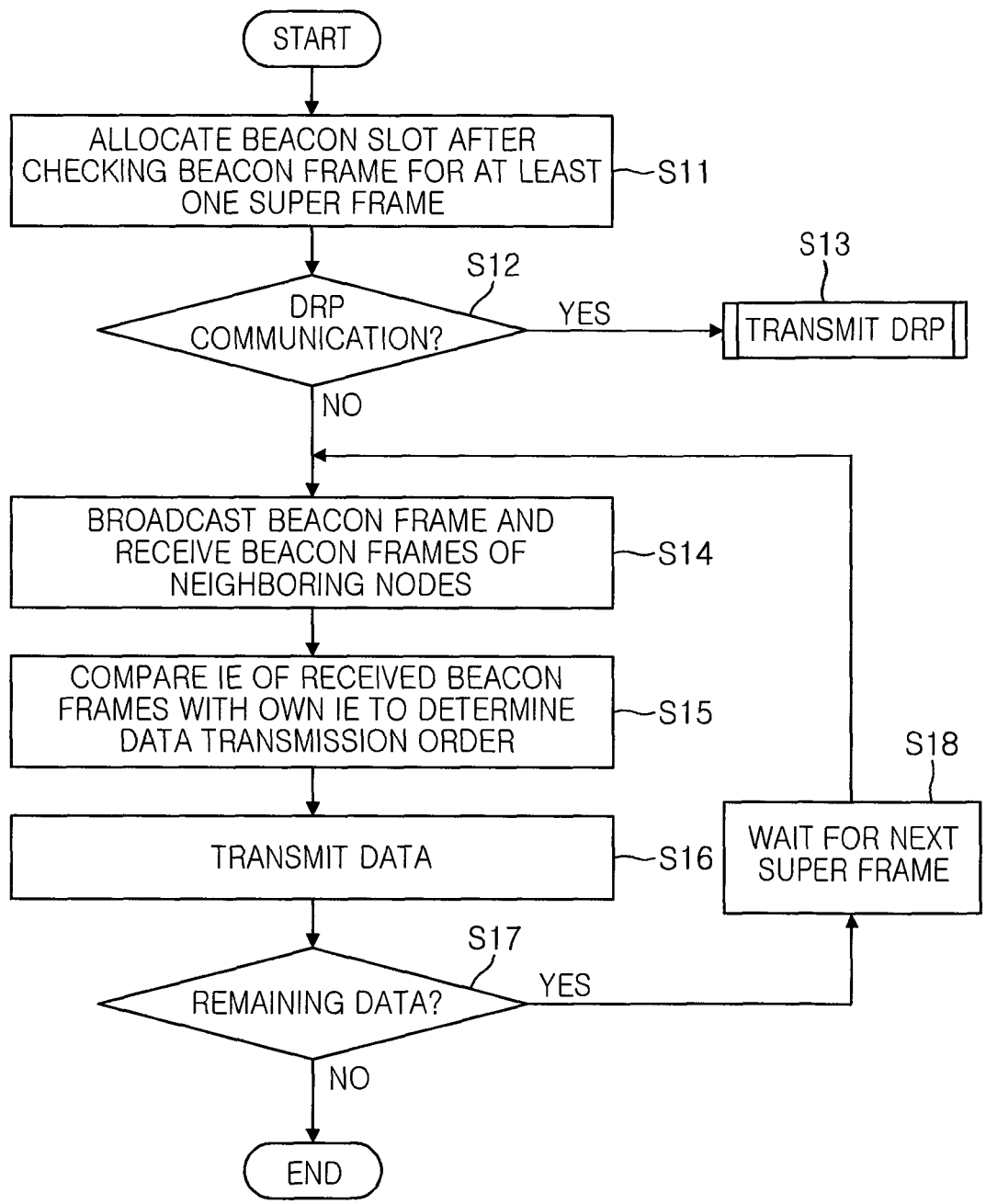
FIG. 1 is a flow chart showing a media access control method in a wireless network according to an embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art FIG. 1 is a flow chart showing a WiMedia network operation method according to an embodiment of the present invention. Referring to FIG. 1, the WiMedia network operation method according to the embodiment of the present invention may include an operation S11 in which each of devices in a network determine one of a plurality of beacon slots within a beacon period to be a beacon slot of the device, operations S14 and S15 in which the devices in the network determine a data transmission order in an unreserved period of a data transmission period, depending on the slot numbers of the beacon slots of the devices, and an operation S16 of transmitting data in the unreserved period in accordance with the data transmission order determined in the operations S14 and S15.

Figures 2, 3:
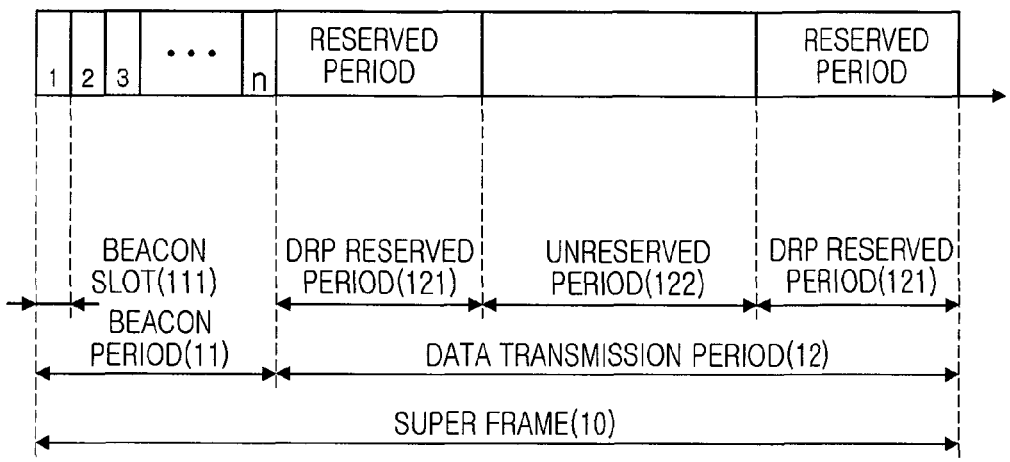
FIG. 2 shows the structure of a super frame used for data transmission and reception of a media access control method in a typical wireless network.
FIG. 3 is a diagram showing an example of an information element which is applied to the media access control method according to the embodiment of the present invention.

FIG. 2 shows the structure of a super frame used for data transmission and reception in the WiMedia network. Referring to FIG. 2, the super frame 10 used for operating the WiMedia network may be roughly divided into a beacon period 11 and a data transmission period 12. The beacon period 11 may include a plurality of beacon slots 111 to each of which a single device is allocated. The data transmission period 12 may include a distributed reservation protocol (DRP) reserved period 121 including time slots reserved by the devices and an unreserved period 122 which is not reserved by the devices. The present invention provides a method in which the devices use the unreserved period 122 without competition in the structure of the super frame 10.

Returning to FIGS. 1 and 2, the operation S11 in which each of the devices determines one of the plurality of beacon slots within a beacon period to be a beacon slot of the device may be described in more detail as follows. First, each of the devices within the network scans beacon slots which are being currently used, and then determines one of the beacon slots within the beacon period 11 as the beacon slot of the device. More specifically, after scanning the beacon period 11, each of the devices determines one of the plurality of beacon slots after a beacon slot having the largest beacon slot number among the beacon slots which are being currently used within the beacon period 11, as the beacon slot of the device.

Subsequently, after the beacon period 11 is ended, it is checked whether communication according to the DRP scheme is performed in the DRP reserved period 121 or communication is performed in the unreserved period 122 (S12). When the communication according to the DRP scheme should be performed, data transmission is performed by the DRP scheme (S13).

Meanwhile, when the communication should be performed using the unreserved period 122, the devices within the network determine the data transmission order depending on the slot numbers of the beacon slots of the devices (S14 and S15). Then, data may be transmitted in the unreserved period in accordance with the determined data transmission order (S16).

In the operation in which the data transmission order is determined depending on the slot numbers, the devices may broadcast an information element composed of fields including a variety of information related to their data transmission (S14). After each of the devices receives the information elements of the other devices within the network, the data transmission order in the unreserved period may be determined depending on the information of the various fields included in the information elements and the slot numbers of the beacon slots (S15).

FIG. 3 is a diagram showing an example of the information element which is applied to the WiMedia network operation method according to the embodiment of the present invention. Referring to FIG. 3, the information element applied to the WiMedia network operation method according to the embodiment of the present invention may include a plurality of fields 22 to 26. For example, an Element ID field 21 is a field into which identification information about a device transmitting the information element is written, and a Length field 22 is a field into which the length of data to be transmitted is written. Furthermore, a Reference Point (RP) field 23 is a field indicating that a device is the first data transmission device in a non-competition period, and a Target Dev. Addr. field 24 is a field indicating the address of a destination device of the data to be transmitted. Furthermore, a Queue Existence (QE) field 25 is a field indicating whether data to be transmitted by a device exists or not, and an Access Category (AC) field is a field into which a transmission opportunity TXOP of data transmission depending on the form of data to be transmitted is written. According to the embodiment of the present invention, a device in its data transmission turn may determine the AC field to transmit data at a maximum transmission opportunity TXOP.

In the information element shown in FIG. 3, the RP field 23 and the QE field 25 are used for determining the data transmission order of the devices.

First, the QE field 25 may be considered to determine the data transmission order. For example, when each of the devices has data to transmit, '1' may be written into the QE field 25. When the device does not have data to transmit, '0' may be written into the QE field 25. Each of the devices may check the QE fields from the information elements received from the other devices within the network, and check its data transmission order in consideration of its slot number and the QE fields of the other devices. That is, the data transmission order of the devices in the unreserved period may be determined in accordance with the slot numbers of the beacon slots allocated to the devices in which the QE field is represented by '1', excluding the devices in which the QE field is represented by '0'.

Next, the RP field 23 may be considered to determine the data transmission order. The RP field 23 is a field indicating a device which transmits data first in the unreserved period. A device in which the RP field is represented by '1' becomes a device which transmits data first in the unreserved period, and the other devices may determine the data transmission order in accordance with the sequence of the slot numbers from a device having the next slot number to the slot number of the device in which the RP field 23 is represented by '1'. The device having an RP field value of '1' may be changed when a predetermined number of super frames pass. As such, the change of the RP field 23 may prevent one device from continuously monopolizing the first data transmission order, which makes it possible to provide the fairness of the data transmission order for the overall devices within the network. Furthermore, since the respective devices avoid competitive data transmission in the unreserved period, the waste of time slots caused by collision may be removed, and the data transmission rate and throughput may be improved.

Returning to FIG. 1, when one super frame is terminated, it is checked whether the device having been transmitting data has transmitted all of the data which is to be transmitted or whether remaining data exists (S17). When remaining data exists, the device waits for a next super frame (S18), and then may resume the data transmission depending on the data transmission order which is to be determined for the next super frame.

Figure 4A:
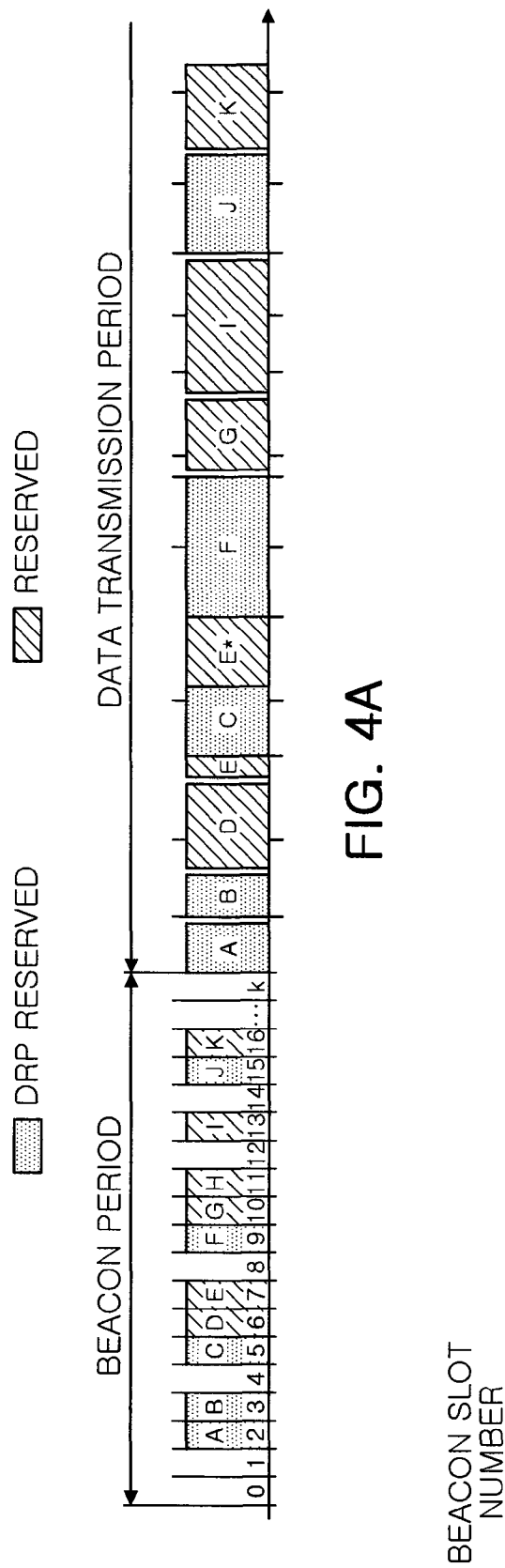
FIGS. 4A and 4B are diagrams explaining the media access control method according to the embodiment of the present invention.
Figure 4B:
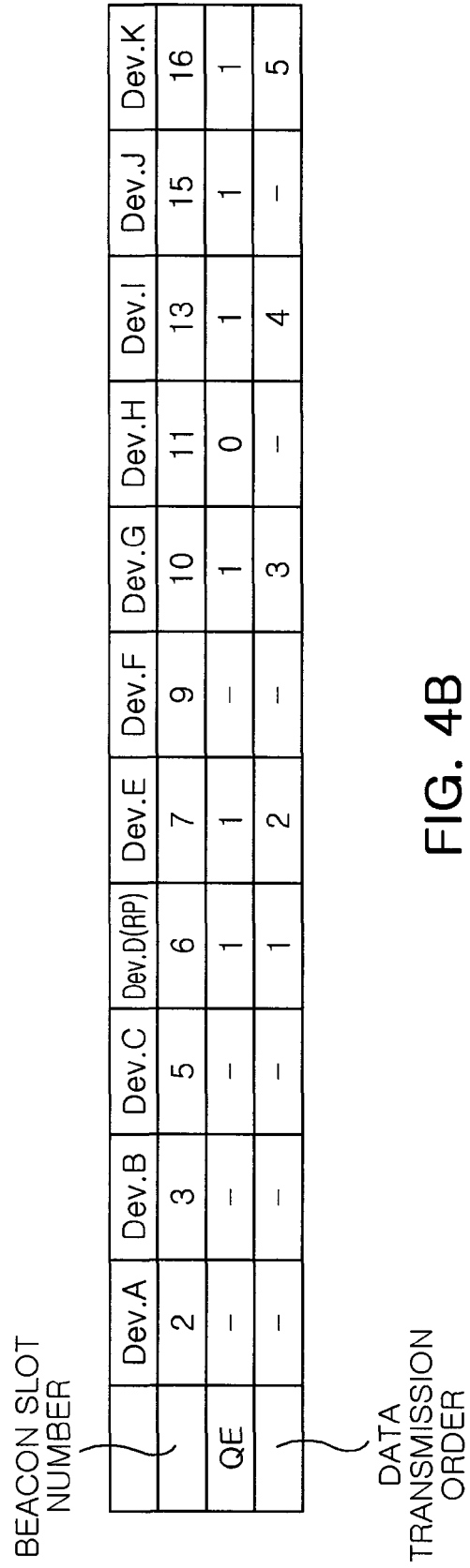

FIGS. 4A and 4B are diagrams explaining the WiMedia network operation method according to the embodiment of the present invention. FIG. 4A shows an example of a super frame structure used in a WiMedia network in which devices A to K are operated, and FIG. 4B shows beacon slot numbers of the respective devices, values of QE fields included in information elements of the respective devices, and a data transmission order in the super frame structure shown in FIG. 4A.

Referring to FIGS. 4A and 4B, beacon slots corresponding to the beacon slot numbers 2, 3, 5, 6, 7, 9, 10, 11, 13, 15, and 16 are sequentially allocated to the devices A to K, respectively, in the beacon period. The devices A, B, C, F, and J among the overall devices transmit data through a reserved transmission period which is previously allocated, and the other devices D, E, G, H, I, and K transmit data through an unreserved transmission period. At this time, the data transmission order of the devices D, E, G, H, I, and K in the unreserved transmission period should be determined.

According to the embodiment of the present invention, the data transmission order in the unreserved transmission period is determined depending on the beacon slot numbers allocated to the respective devices and the RP fields and the QE fields of the information elements transmitted by the respective devices.

First, the QE fields of the information elements of the devices D, E, G, H, I, and K which are to transmit data through the unreserved period may be checked. In this example, only the QE field of the device H is represented by '0', and the QE fields of the other devices D, E, G, I, and K are represented by '1'. This indicates that the device H has no data to transmit. Therefore, the data transmission order may be determined for the devices D, E, G, I, and K.

Next, the RP fields of the information elements of the devices D, E, G, I, and K may be checked. In this example, the RP field of the device D is represented by '1', which indicates that the device D is a first device to transmit data through the unreserved transmission period.

As such, considering the information elements and the beacon slot numbers of the respective devices, the devices D, E, G, I, and K having a QE field value indicating that they have data to transmit through the unreserved period are determined to be devices which are to transmit data using the unreserved period. Among them, the device D having an RP field value of 1 becomes the first device to transmit data through the unreserved period. After that, the devices E, G, I, and K sequentially transmit data in accordance with the beacon slot numbers during the unreserved period.

Meanwhile, when a predetermined super frame is terminated, the RP fields of the information elements may be changed in such a manner that another device has an RP value of '1'. In this case, it is possible to prevent only one device from continuously transmitting data first such that the fairness of the data transmission priority among the respective devices may be provided. For example, after a predetermined super frame is terminated, the RP field of the information element transmitted by the device E may be represented by '1' such that the device E becomes a device to transmit data first, and the RP fields of the information elements transmitted by the other devices may be represented by '0'. Therefore, after the predetermined super frame is terminated, the devices E, G, I, and K sequentially transmit data, and the device D transmits data last. That is, when the device having an RP field value of '1' is changed in accordance with the beacon slot numbers at every predetermined super frame, the device which has transmitted data first is changed to a device to transmit data last after a predetermined super frame. Therefore, it is possible to provide for the fairness of the data transmission order.

Figure 5:
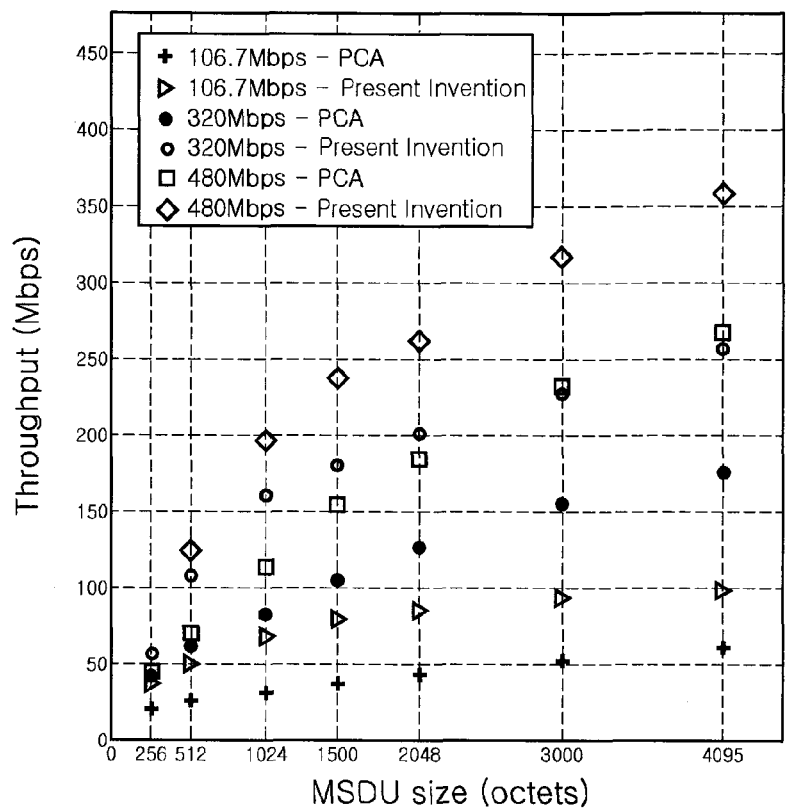
FIGS. 5 and 6 are graphs comparing the performance of the network according to the embodiment of the present invention with the performance of a network to which a conventional competition-type unreserved period communication method is applied.
Figure 6:
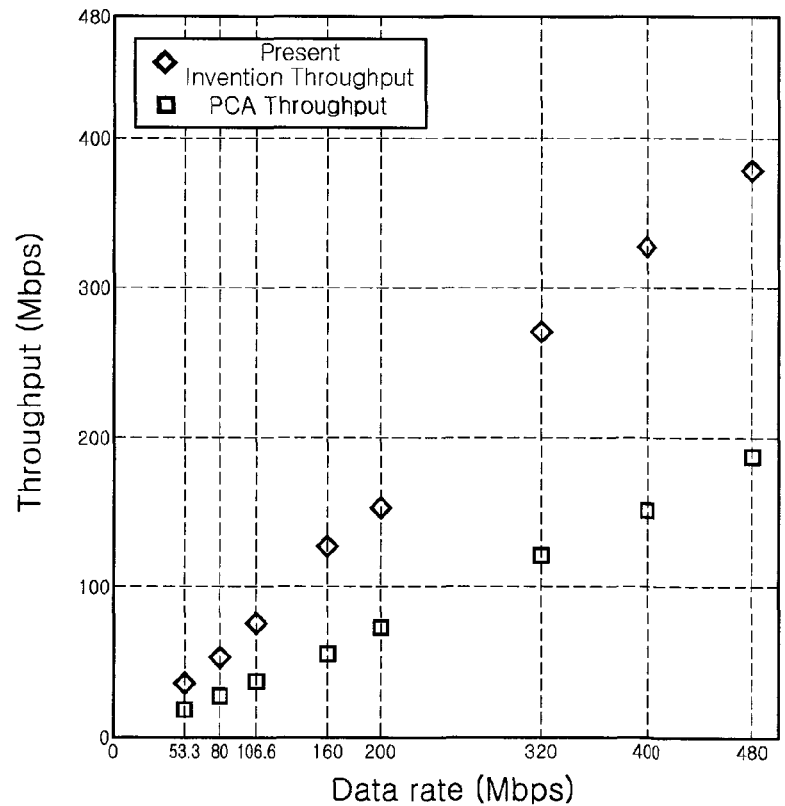

FIGS. 5 and 6 are graphs comparing the performance of the network according to the embodiment of the present invention with the performance of the network to which the conventional competition-type unreserved period communication method is applied. FIG. 5 shows throughputs depending on MAC service data unit (MSDU) sizes. FIG. 6 shows throughputs depending on data rates. Referring to FIGS. 5 and 6, it can be seen that the throughput of the method according to the embodiment of the present invention is much larger than that of the conventional competition-type PCA communication method.

As described above, the method according to the embodiment of the present invention solves the defects of competitive channel access of the CSMA/CA method and enables the overall devices to equally acquire a transmission opportunity. Therefore, it is possible to obtain high transmission efficiency. That is, it is possible to reduce the waste of a time slot caused by overhead and collision due to the competitive access in the PCA period of the conventional CSMA/CA method. In particular, since the EDCA scheme of IEEE 802.11e is introduced to the communication for the PCA period applied to the conventional WiMedia network, it may increase the complexness of a distributed media access control (DMAC) system which performs independent communication using beacon information. However, since only the new information elements are additionally introduced to the method according to the embodiment of the present invention, the complexity and overhead may be reduced.

While the present invention has been shown and described in connection with the exemplary embodiments, it will be apparent to those skilled in the art that modifications and variations can be made without departing from the spirit and scope of the invention as defined by the appended claims.

What is claimed is:

1. A media access control method in a wireless network including a plurality of devices, the media access control method comprising:
    first determining including determining, by each of the devices in the wireless network, one of a plurality of beacon slots within a beacon period as a beacon slot of the device;
    second determining including determining, by each of the devices in the wireless network, a data transmission order in accordance with a slot number of the beacon slot of the device, slot numbers of the beacon slots of the other devices, and whether or not the devices have data to transmit; and transmitting, by each of the devices in the wireless network, data in an unreserved period in accordance with the determined data transmission order, wherein the second determining further includes broadcasting, by each of the devices, an information element containing a first field indicating whether or not the device has data to be transmitted in the unreserved period, and receiving, in each of the devices, the information elements of the other devices in order to check whether or not the corresponding devices have data to transmit, and to determine the data transmission order depending on the slot number of the beacon slot of the device, the slot numbers of the beacon slots of the other devices, and whether or not the devices have data to transmit.

2. The media access control method of claim 1, wherein the first determining further includes scanning beacon slots being used, and determining one of the plurality of beacon slots after a beacon slot having a largest beacon slot number among the beacon slots being used within the beacon period as the beacon slot of the device.

3. The media access control method of claim 1, wherein the information element further contains a second field indicating that the device has a priority to transmit the data in the unreserved period, and the second determining further includes setting the device having the priority as a device to transmit data first in the unreserved period.

4. The media access control method of claim 3, wherein the device having the priority is changed at every predetermined super frame.

5. The media access control method of claim 1, wherein the transmitting includes transmitting the data at a permissible maximum transmission opportunity when the device to transmit the data in accordance with the determined data transmission order transmits the data.

6. The media access control method of claim 1, further comprising:

third determining, before the first determining, whether the data is to be transmitted in a reserved period or the unreserved period of a data transmission period of a super frame; and transmitting, when it is determined that the data is to be transmitted in the reserved period, the data in the reserved period.

7. The media access control method of claim 6, further comprising:

checking, when the super frame is terminated, whether there is remaining data to be transmitted in the device;

waiting, when it is determined that there is the remaining data to be transmitted in the device, for a next super frame; and repeating the first determining, the second determining, and the transmitting for the next super frame.

* * * * *